United States Patent
Rohrbacher et al.

[15] 3,654,894
[45] Apr. 11, 1972

[54] PASTRY COATING APPARATUS

[72] Inventors: James T. Rohrbacher, Chicago; Richard C. Wagner, Clarendon Hills, both of Ill.

[73] Assignee: Integral Process Systems, Inc.

[22] Filed: May 11, 1970

[21] Appl. No.: 36,206

Related U.S. Application Data

[63] Continuation-in-part of Ser. No. 755,592, Aug. 27, 1968, Pat. No. 3,537,404.

[52] U.S. Cl................................118/17, 118/24, 118/324, 118/DIG. 4
[51] Int. Cl..........................A23g 3/20, B05c 5/02
[58] Field of Search..................118/13, 17, 24, 70, 204, 325, 118/407, 324, DIG. 4

[56] References Cited

UNITED STATES PATENTS

| | | | |
|---|---|---|---|
| 2,030,572 | 2/1936 | Donnini | 118/407 X |
| 2,578,427 | 12/1951 | Hussey et al. | 118/320 X |
| 2,144,924 | 1/1939 | King | 118/13 |
| 1,737,447 | 11/1929 | Baker et al. | 118/17 X |
| 1,979,758 | 11/1934 | Merritt | 118/70 X |
| 1,255,245 | 2/1918 | Taylor | 118/204 |
| 596,905 | 1/1898 | McCoy | 118/325 X |
| 1,686,426 | 10/1928 | Waldron et al. | 118/325 X |
| 1,932,727 | 10/1933 | Faulkner | 118/407 |

*Primary Examiner*—John P. McIntosh
*Attorney*—Dressler, Goldsmith, Clement & Gordon

[57] ABSTRACT

An apparatus and method for automatically and continuously providing a coating on an upper surface of individual pastries including a liquid reservoir at a dispensing station, means for maintaining a preselected level of liquid within said reservoir, a rotary drum having a portion disposed below the liquid level in said reservoir for picking up liquid by surface adhesion, said drum having a portion disposed above the level of liquid in said reservoir, stripping means for removing liquid from the exposed portion of said drum and for depositing the liquid on said pastries on a continuously movable foraminous conveyor with excess liquid passing through said conveyor for recycle to said reservoir.

9 Claims, 2 Drawing Figures

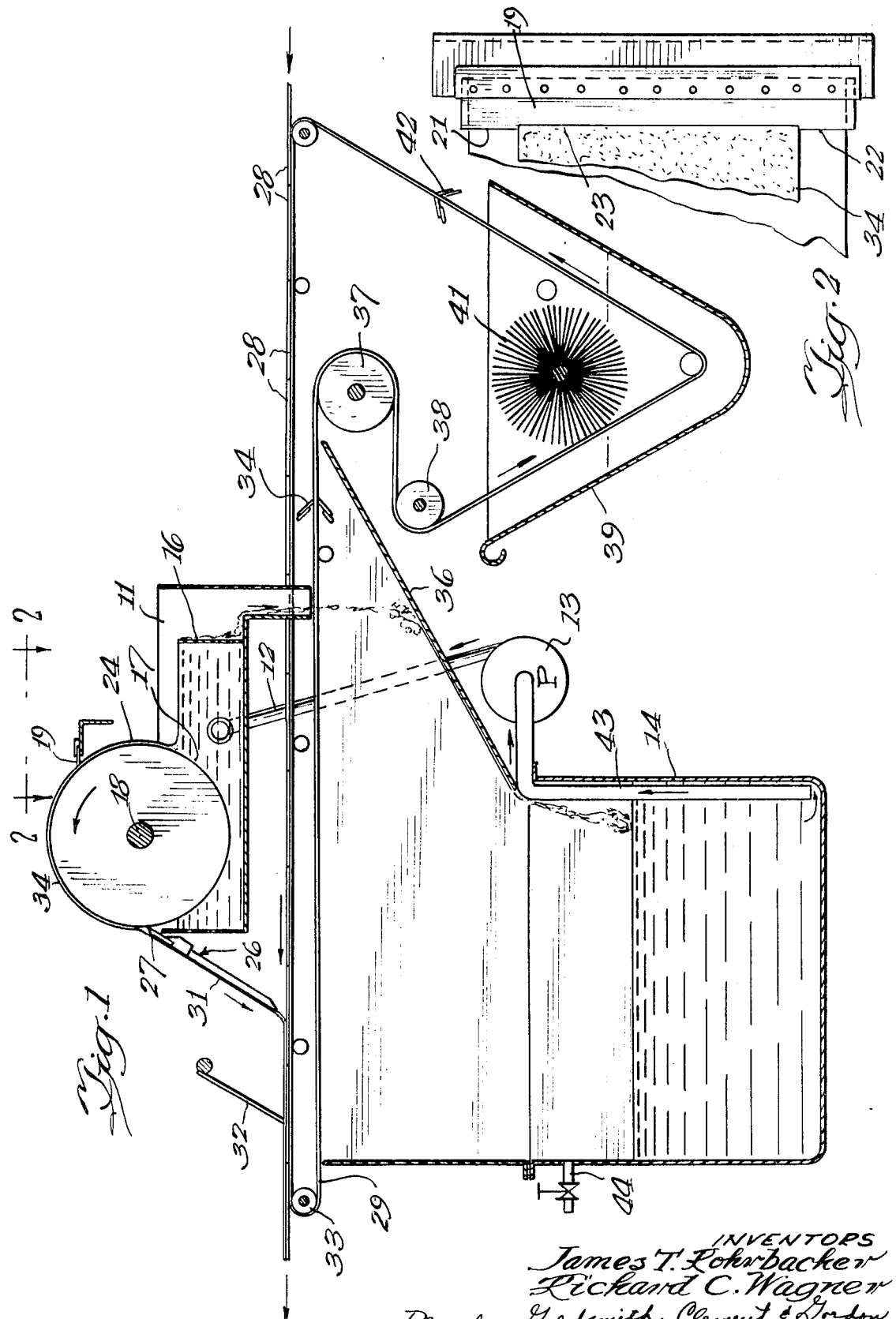

PASTRY COATING APPARATUS

CROSS-REFERENCE TO RELATED APPLICATION

This application is a continuation-in-part of our application Ser. No. 755,592, filed on Aug. 27, 1968 now U.S. Pat. No. 3,537,404.

BACKGROUND OF THE INVENTION

The present application relates to apparatus for preparing foodstuffs, and particularly baked goods such as pizzas and cakes having flavored coatings thereon. More particularly, the present invention relates to apparatus for automatically and continuously processing flavor sauces and icings to produce coated individual pastries at a high rate of speed with a minimum use of manpower.

In some forms of pastries, flavoring materials coated on the upper surface of the pastry comprise an essential element thereof and provide the pastries with distinctive characteristics. For example, in the ethnic pastries called "pizzas," most of the flavoring is in the tomato-based pizza sauce which is on the upper surface of the baked pizza dough. Similarly, in some forms of cakes and Danish pastries, a sugar-containing icing on the upper surface of the baked dough is an essential component of the finished product.

Various manual and partially automated procedures have been used to apply flavorings such as sauces and icings to the upper surface of pastry products in commercial operations by dripping, brushing and other modes of application. However, none of these procedures has been fully satisfactory with respect to speed and ease of operation, minimum handling and uniformity and control of the flavoring layer applied.

SUMMARY OF THE INVENTION

The present invention provides a continuously operable liquid flavoring processor including a novel means for providing a layer of flavoring of predetermined thickness on each pastry. To this end, a reservoir of flavoring is provided at a liquid dispensing station, and a predetermined level of flavoring is retained in the reservoir by overflow means at a desired level in said reservoir for returning excess flavoring to a flavoring source. A rotary drum is provided at the dispensing station, with a portion of the drum being immersed in the liquid flavoring in the reservoir, and with a portion of the drum being disposed above the upper surface of the flavoring. The drum is rotated at a speed sufficient to cause the drum to pick up the flavoring by surface adhesion. An inclined blade is positioned in liquid stripping relationship with respect to the exposed portion of the drum, so that as the drum rotates, the liquid carried by the drum will be stripped therefrom in web form. A pair of adjustable, laterally spaced stripping blades are also positioned in material stripping relationship with respect to the drum for controlling the width of the web of liquid. A continuously moving mesh conveyor carrying individual pastries is positioned below the inclined stripping blade, and the pastries on the conveyor receive the web of material from the drum, each pastry retaining on its upper surface a portion of the web, with excess flavoring material passing through the mesh conveyor for recycle to the reservoir.

The conveyor carrying the thus top-coated pastries continues in its path to permit additional processing of the pastries, if desired, and to discharge to a packaging station. In its return path after removal of the pastries, the conveyor is stripped of excess flavoring material and washed clean for its next recycle.

BRIEF DESCRIPTION OF THE DRAWINGS

FIG. 1 is a side elevation, partly in section, of the apparatus of the present invention; and FIG. 2 is a fragmentary plan view, of a portion of the apparatus, as seen from plane 2—2 of FIG. 1.

DETAILED DESCRIPTION OF THE PREFERRED EMBODIMENT

While the invention is susceptible of embodiment in many different forms, there is shown in the drawing and will herein be described in detail one specific embodiment, with the understanding that the present disclosure is to be considered as an exemplification of the principles of the invention and is not intended to limit the invention to the embodiment illustrated. The scope of the invention will be pointed out in the appended claims.

Referring now to the drawing in detail, the apparatus of the present invention includes a reservoir 11, in the form of an upwardly open generally rectangularly shaped pan provided at the dispensing station and is adapted to contain a preselected quantity of flavoring liquid therein. Flavoring liquid is pumped into reservoir 11 through a line 12 that extends through pump 13 to a suitable source of flavoring liquid in storage tank 14, and the liquid is maintained at a preselected level within reservoir 11 by a weir 16 that allows excess liquid to overflow to the liquid source.

A cylindrically shaped drum 17 has stub shafts 18 at opposite ends thereof and is rotatably mounted in a suitable support. The drum 17 is positioned with its lower surface immersed within the flavoring liquid in reservoir 11, with the upper portion of drum 17 being exposed above the reservoir 11. As the drum 17 is rotated in a counterclockwise direction, as viewed in FIG. 1, the liquid within the reservoir 11 will adhere to the drum 17, and a layer of liquid 24 will be lifted out of the reservoir 11 and transported on the drum surface.

As the drum rotates, carrying liquid out of reservoir 11, the drum surface passes in close proximity to trimmer 19, comprising (as seen in FIG. 2) marginal wipers 21 and 22 in direct contact with the drum surface and recessed portion 23, spaced a short distance from the drum surface. As the drum rotates past trimmer 19, the marginal wipers control the width of the web of liquid on the drum and the recessed portion serves as a check against excessive thickness.

Stripper 26 comprises a flexible stripping blade 27 and an inclined ramp 31 to remove the layer of liquid from the drum and transfer it onto the upper surface of the pastries 28 passing therebelow on endless conveyor 29. The pastries are carried on the upper surface or supporting surface of the conveyor 29 and may be in a single row or in multiple rows and be rectangular, circular or of any desired shape. They should, however, be as closely spaced as possible so that as much as possible of the web of liquid on inclined ramp 31 is transferred to pastry tops. Conveyor 29 has means associated therewith for permitting excess liquid which is not deposited on the pastry tops to pass through the supporting surface of the conveyor. In the illustrated embodiment, the conveyor 29 is of mesh, or foraminous construction so that any flavoring liquid which is not deposited on the pastry tops passes through the conveyor into storage tank 14 which acts as a collection means for the excess liquid.

The top-coated pastries move on the conveyor (leftward in FIG. 1), passing under brush 32, which evens the coating and removes excess liquid, to the end of the conveyor where they are removed for further processing, if desired, and for packaging.

After the conveyor completes its reach, its direction is reversed by roller 33, which starts it on its return path. The conveyor then moves past wipers 34 which remove most of the flavoring liquid which may adhere to the belt, dropping it onto inclined ramp 36 which leads it to storage tank 14. The belt then passes over rollers 37 and 38 into washing tank 39. In the washing tank, the belt passes through a pool of wash water and is scrubbed by rotating brush 41 to remove any adherent flavoring liquid. Excess wash water is removed by wipers 42 prior to return of the belt to its pastry carrying reach.

The flavoring liquid in storage tank 14 is continuously pumped through line 43, pump 13 and line 12 into reservoir 11, and fresh flavoring liquid is supplied to the storage tank, as needed, through line 44.

As stated above, the flavoring liquid may be a tomato-based sauce when the pastries are made of pizza dough, or the flavoring liquid may comprise a sugar-based icing when the pastries are of a type which are compatible with such an icing. If desired, other components may be added to the pastry tops after the application of flavoring liquid thereto. For example, particles of cheeses, spices, meats, or other flavoring materials may be distributed over the surface of the pizza sauce on the pizza pastries by hand, or by appropriate dispensing equipment (not shown). Or, where the flavoring liquid is a sugar icing material, particles, such as nutmeats, may be added.

The pastries carried by conveyor 29 may be unbaked, partially baked, or fully baked, as desired. Products such as Danish pastries are usually fully baked. Pizza products intended to be sold in frozen state are usually partially baked; and the coated pizza products are led from conveyor 29 directly into flash freezing equipment for instantaneous freezing.

Where the flavoring liquid is a sugary icing material, it may be necessary to heat the liquid in storage tank 14, as by steam coils (not shown) in order to maintain the flavoring material in liquid state.

In operation the thickness of the layer of liquid flavoring material picked up by the drum and transferred ultimately to the pastries may be controlled by speed of rotation of the drum. Alternatively, either as a check against excessive thickness, or as a primary thickness control, the thickness of the liquid layer on the drum may be regulated by the distance between the drum surface and recessed portion 23 of trimmer 19. The width of the liquid layer on the drum may be controlled by the position of marginal wipers 21 and 22.

It will be understood by those skilled in the art that variations and modifications of the specific embodiments described above may be employed without departing from the scope of the invention as defined in the appended claims.

We claim:

1. Apparatus for providing a coating on an upper surface of individual pastries comprising a reservoir, means for retaining a predetermined level of liquid flavoring material in said reservoir, a pick-up drum having an immersed portion disposed in said liquid flavoring material and an exposed portion disposed above the level thereof, means for rotating said drum to cause a predetermined layer of said liquid flavoring material to adhere to said drum and to travel with said drum, a storage tank below said drum, foraminous endless conveyor means disposed between said drum and said storage tank for conveying individual pastries, and scraper means engaging the exposed portion of said drum for removing said layer of liquid flavoring material and depositing said layer onto the upper surface of said individual pastries while excess material from said layer passes through said conveyor means into said tank.

2. Apparatus as set forth in claim 1 wherein said liquid level retaining means includes means connecting said reservoir to a source of liquid flavoring material, an overflow means at a predetermined level in said reservoir for returning excess liquid to said source.

3. Apparatus as set forth in claim 1 wherein said scraper means includes a stripping blade having a first edge adjacent the periphery of said drum for stripping the layer of liquid therefrom.

4. Apparatus as set forth in claim 3 wherein said scraper means includes an inclined ramp which extends downwardly and away from said stripping blade and terminates in a lower edge adjacent said conveyor.

5. Apparatus as set forth in claim 1 including means adjacent the exposed portion of said drum for controlling the width of the layer of liquid carried by said drum.

6. Apparatus for providing a coating on an upper surface of individual pastries comprising a reservoir, means for retaining a predetermined level of liquid flavoring material in said reservoir, a pick-up drum having an immersed portion disposed in said liquid flavoring material and an exposed portion disposed above the level thereof, means for rotating said drum to cause a layer of said liquid flavoring material to adhere to said drum and to travel with said drum, conveyor means disposed below said drum for conveying individual pastries, scraper means disposed adjacent the exposed portion of said drum for removing said layer of liquid flavoring material and for depositing at least a portion of said layer onto the upper surface of said individual pastries; collection means located below said conveyor means; and means for permitting excess liquid from said layer to pass to said collection means.

7. Apparatus as set forth in claim 6, including means for washing said conveyor means free of liquid flavoring material.

8. Apparatus as set forth in claim 6, wherein said conveyor means is foraminous to permit excess liquid from said layer to pass to said collection means.

9. Apparatus as set forth in claim 6, and including means to recycle excess liquid from said collection means to said reservoir.

* * * * *